(12) United States Patent
Wuidart

(10) Patent No.: US 6,879,246 B2
(45) Date of Patent: Apr. 12, 2005

(54) EVALUATION OF THE NUMBER OF ELECTROMAGNETIC TRANSPONDERS IN THE FIELD OF A READER

(75) Inventor: Luc Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 541 days.

(21) Appl. No.: 09/853,890

(22) Filed: May 11, 2001

(65) Prior Publication Data

US 2002/0021207 A1 Feb. 21, 2002

(30) Foreign Application Priority Data

May 12, 2000 (GB) .............................................. 0006065

(51) Int. Cl.$^7$ ................................................ H04Q 1/00
(52) U.S. Cl. ................................... 340/10.2; 340/10.32
(58) Field of Search .......................... 340/825.54, 10.2, 340/870.32, 10.71, 10.32

(56) References Cited

U.S. PATENT DOCUMENTS

| | | | |
|---|---|---|---|
| 2,411,555 A | | 11/1946 | Rogers |
| 3,618,089 A | | 11/1971 | Moran, Jr. et al. |
| 4,068,232 A | | 1/1978 | Meyers et al. |
| 4,209,783 A | | 6/1980 | Ohyama et al. |
| 4,278,977 A | | 7/1981 | Nossen |
| 4,375,289 A | | 3/1983 | Schmall et al. |
| 4,408,185 A | | 10/1983 | Rasmussen |
| 4,593,412 A | | 6/1986 | Jacob |
| 4,656,472 A | | 4/1987 | Walton |
| 4,660,192 A | | 4/1987 | Pomatto, Sr. |
| 4,673,932 A | * | 6/1987 | Ekchian et al. .......... 340/10.32 |
| 4,706,050 A | | 11/1987 | Andrews |
| 4,782,308 A | | 11/1988 | Trobec et al. |
| 4,802,080 A | | 1/1989 | Bossi et al. |
| 4,814,595 A | | 3/1989 | Gilboa |

(Continued)

FOREIGN PATENT DOCUMENTS

| | | |
|---|---|---|
| EP | 0 369 622 | 5/1990 |
| EP | 0 568 067 A | 11/1993 |
| EP | 0 579 332 A1 | 1/1994 |
| EP | 0 645 840 A | 3/1995 |
| EP | 0 768 540 | 4/1997 |
| EP | 0 857 981 A1 | 8/1998 |
| EP | 0 902 475 A | 3/1999 |
| GB | 2 298 553 A | 9/1996 |
| GB | 2 321 726 A1 | 8/1998 |
| JP | 407245946 A | 9/1995 |
| JP | 10-145267 | 5/1998 |
| JP | 10-203066 | 8/1998 |
| WO | WO 93/17482 | 9/1993 |
| WO | WO 98/20363 | 5/1998 |
| WO | WO 99/33017 | 7/1999 |
| WO | 9943096 | 8/1999 |

OTHER PUBLICATIONS

French Search Report from French Patent Application No. 99 09563, filed Jul. 20, 1999.

French Search Report from French Patent Application No. 98 08025, filed Jun. 20, 1998.

French Search Report from French Patent Application No. 99 04547, filed Apr. 7, 1999.

(Continued)

*Primary Examiner*—Brian Zimmerman
(74) *Attorney, Agent, or Firm*—Lisa K. Jorgenson; James H. Morris; Wolf, Greenfield & Sacks, P.C.

(57) ABSTRACT

A terminal for generating a high-frequency electromagnetic field by an oscillating circuit, adapted to cooperating with at least one transponder when the transponder enters this field, and a method for establishing a communication between the devices, including circuitry for regulating the signal phase in the oscillating circuit with respect to a reference value and circuitry for evaluating, based on a measurement of the current in the oscillating circuit, the minimum number of transponders present in the field.

25 Claims, 5 Drawing Sheets

U.S. PATENT DOCUMENTS

| | | |
|---|---|---|
| 4,827,266 A | 5/1989 | Sato et al. |
| 4,928,108 A | 5/1990 | Kropielnicki et al. |
| 4,963,887 A | 10/1990 | Kawashima et al. |
| 5,013,898 A | 5/1991 | Glasspool |
| 5,055,853 A | 10/1991 | Garnier |
| 5,084,699 A | 1/1992 | DeMichele |
| 5,099,227 A | 3/1992 | Geiszler et al. |
| 5,126,749 A | 6/1992 | Kaltner |
| 5,142,292 A | 8/1992 | Chang |
| 5,202,644 A | 4/1993 | Brady |
| 5,214,409 A | 5/1993 | Beigel |
| 5,305,008 A | 4/1994 | Turner et al. |
| 5,324,315 A | 6/1994 | Grevious |
| 5,452,344 A | 9/1995 | Larson |
| 5,493,267 A | 2/1996 | Ahlse et al. |
| 5,504,485 A | 4/1996 | Landt et al. |
| 5,519,381 A | 5/1996 | Marsh et al. |
| 5,521,602 A | 5/1996 | Carroll et al. |
| 5,541,604 A | 7/1996 | Meier |
| 5,550,536 A | 8/1996 | Flaxl |
| 5,604,411 A | 2/1997 | Venkitasubrahmanian et al. |
| 5,619,529 A | 4/1997 | Fujioka |
| 5,621,411 A | 4/1997 | Hagl et al. |
| 5,691,605 A | 11/1997 | Xia et al. |
| 5,698,837 A | 12/1997 | Furuta |
| 5,698,838 A | 12/1997 | Yamaguchi |
| 5,701,121 A | 12/1997 | Murdoch |
| 5,703,573 A | 12/1997 | Fujimoto et al. |
| 5,767,503 A | 6/1998 | Gloton |
| 5,801,372 A | 9/1998 | Yamaguchi |
| 5,831,257 A | 11/1998 | Yamaguchi |
| 5,850,416 A | 12/1998 | Myer |
| 5,874,725 A | 2/1999 | Yamaguchi |
| 5,883,582 A | 3/1999 | Bowers et al. |
| 5,889,273 A | 3/1999 | Goto |
| 5,905,444 A | 5/1999 | Zimmer |
| 5,955,950 A | 9/1999 | Gallagher, III et al. |
| 6,014,088 A | 1/2000 | Van Santbrink et al. |
| 6,025,780 A | 2/2000 | Bowers et al. |
| 6,028,503 A | 2/2000 | Preishuberpflugl et al. |
| 6,034,640 A | 3/2000 | Oida et al. |
| 6,070,803 A | 6/2000 | Stobbe |
| 6,070,804 A | 6/2000 | Miyamoto |
| 6,072,383 A | 6/2000 | Gallagher, III et al. |
| 6,075,491 A | 6/2000 | Dakeya et al. |
| 6,100,788 A | 8/2000 | Frary |
| 6,137,411 A | 10/2000 | Tyren |
| 6,150,986 A | 11/2000 | Sandberg et al. |
| 6,154,635 A | 11/2000 | Ohta |
| 6,172,608 B1 | 1/2001 | Cole |
| 6,208,235 B1 | 3/2001 | Trontelj |
| 6,229,443 B1 | 5/2001 | Roesner |
| 6,243,013 B1 | 6/2001 | Duan et al. |
| 6,265,962 B1 | 7/2001 | Black et al. |
| 6,272,320 B1 | 8/2001 | Nandra et al. |
| 6,272,321 B1 | 8/2001 | Bruhnke et al. |
| 6,281,794 B1 | 8/2001 | Duan et al. |
| 6,304,169 B1 | 10/2001 | Blama et al. |
| 6,307,468 B1 | 10/2001 | Ward, Jr. |
| 6,307,517 B1 | 10/2001 | Lee |
| 6,335,665 B1 | 1/2002 | Mendelsohn |
| 6,393,045 B1 | 5/2002 | Belcher et al. |
| 6,424,820 B1 | 7/2002 | Burdick et al. |
| 6,441,804 B1 | 8/2002 | Hsien |
| 6,446,049 B1 | 9/2002 | Janning et al. |
| 6,491,230 B1 | 12/2002 | Dubost et al. |
| 6,498,923 B2 | 12/2002 | Ikefuji et al. |
| 6,646,543 B1 * | 11/2003 | Mardinian et al. ......... 340/10.2 |
| 6,650,226 B1 | 11/2003 | Wuidart et al. |
| 6,650,227 B1 | 11/2003 | Bradin |
| 6,650,229 B1 | 11/2003 | Wuidart et al. |
| 6,654,466 B1 | 11/2003 | Ikefuji et al. |
| 6,690,229 B2 | 2/2004 | Rudolph |
| 6,703,921 B1 | 3/2004 | Wuidart et al. |
| 2002/0008611 A1 | 1/2002 | Wuidart |
| 2003/0227323 A1 | 12/2003 | Enguent |

OTHER PUBLICATIONS

French Search Report from French Patent Application No. 99 04546, filed Apr. 7, 1999.
French Search Report from French Patent Application No. 98 08024, filed Jun. 22, 1998.
French Search Report from French Patent Application No. 99 04548, filed Apr. 7, 1999.
French Search Report from French Patent Application No. 99 04544, filed Apr. 7, 1999.
French Search Report from French Patent Application No. 00/01214, filed Jan. 31, 2000.
French Search Report from French Patent Application No. 99 09564, filed Jul. 20, 1999.
French Search Report from French Patent Application No. 00/06301, filed May 17, 2000.
French Search Report from French Patent Application No. 99 04548, filed Apr. 7, 1999.
French Search Report from French Patent Application No. 99 04545, filed Apr. 7, 1999.
French Search Report from French Patent Application No. 99 07024, filed May 31, 1999.
French Search Report from French Patent Application No. 00 06302, filed May 17, 2000.
French Search Report from French Patent Application No. 99 04549, filed Apr. 7, 1999.
French Search Report from French Patent Application 00 06065, filed May 12, 2000.
French Search Report from French Patent Application 00 06061, filed May 12, 2000.
French Search Report from French Patent Application 00 06064, filed May 12, 2000.
French Search Report from French Patent Application 00 06071, filed May 12, 2000.

* cited by examiner

EVALUATION OF THE NUMBER OF ELECTROMAGNETIC TRANSPONDERS IN THE FIELD OF A READER

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. Generally, transponders extract the power supply required by the electronic circuits included therein from the high frequency field radiated by an antenna of the read and write terminal.

The present invention more specifically relates to systems in which several transponders are likely to receive, at the same time, the field radiated by a same read terminal. This regards, in particular, transponder readers provided with no means for isolating a transponder, for example, by introducing said transponder into a slot or the like.

2. Discussion of the Related Art

In such systems, the reader must be able to exhaustively determine the number of transponders present in its field as well as, according to the applications, the number of transponders with which it must simultaneously communicate.

FIG. 1 very schematically shows a conventional example of a data exchange system between a read/write terminal 1 and a transponder 10 of the type to which the present invention relates.

Generally, terminal 1 is essentially formed of a series oscillating circuit formed of an inductance L1 in series with a capacitor C1 and a resistor R1. This series oscillating circuit is controlled by a device 2 that may include, among other things, an amplifier or antenna coupler, a circuit for controlling and exploiting the received data especially provided with a modulator/demodulator and with a microprocessor for processing the control signals and the data. Circuit 2 generally communicates with different input/output circuits (keyboard, screen, means of transmission to a server, etc.) and/or processing circuits, not shown. The circuits of the read/write terminal draw the power required by their operation from a supply circuit (not shown) connected, for example, to the electric supply system.

A transponder 10, intended for cooperating with a terminal 1, essentially includes a parallel oscillating circuit formed of an inductance L2, in parallel with a capacitor C2 between two input terminals 11, 12 of a control and processing circuit 13. Terminals 11, 12 are in practice connected to the input of a rectifying means (not shown), the outputs of which form D.C. supply terminals of the circuits internal to the transponder. These circuits generally include, essentially, a microprocessor, a memory, a demodulator of the signals that may be received from terminal 1, and a modulator for transmitting the data to the terminal.

The oscillating circuits of the terminal and of the transponder are generally tuned on a same frequency corresponding to the frequency of an excitation signal of the terminal's oscillating circuit. This high-frequency signal (for example, at 13.56 MHz) is not only used as a transmission carrier but also as a remote supply carrier for the transponders located in the terminal's field. When a transponder 10 is located in the field of a terminal 1, a high-frequency voltage is generated across terminals 11 and 12 of its resonant circuit. This voltage, after being rectified and possibly clipped, provides the supply voltage of electronic circuits 13 of the transponder.

The high-frequency carrier transmitted by the terminal is generally amplitude-modulated by said terminal according to different coding techniques to transmit data and/or control signals to one or several transponders in the field. In return, the data transmission from the transponder to a terminal is generally performed by modulating the load formed by resonant circuit L2, C2. This load variation occurs at the rate of a sub-carrier having a frequency (for example, 847.5 kHz) smaller than that of the carrier. This load variation can then be detected by the terminal in the form of an amplitude variation or of a phase variation by means, for example, of a measurement of the voltage across capacitor C1 or of the current in the oscillating circuit.

When idle, that is, when no transponder is present in its field, a terminal 1 periodically transmits a modulated data message on the high-frequency signal. This message is a request message intended for possible transponders. This request or general call, is part of a process needed for the initialization of a communication between a transponder and a terminal.

A difficulty in establishing a communication towards one or several transponders is due to the fact that several electromagnetic transponders can simultaneously be present in the terminal's field. The latter must thus be capable of determining not only the number of transponders present in its field, but also those of the transponders that correspond to the application for which it is intended and with which it must communicate.

This constraint requires a loop operation of the terminal control program until all the transponders present in its field have been properly identified.

FIG. 2 very schematically shows an initialization flowchart of one or several communications by a read/write terminal of the type to which the present invention applies.

As soon as it is powered on and in operation, a transponder read/write terminal 1 begins (block 20, ST), after a starting, set, and test phase, a stand-by procedure during which it waits for a communication with at least one transponder to be established. This procedure essentially consists of periodically sending (block 21) a request sequence (REQ) to the possible transponder(s) present in the terminal's field. After each sending of an interrogation request 21, the reader monitors (block 22) the reception by its demodulator of an acknowledgement message (ATQ) coming from a transponder having entered its field. In the absence of an acknowledgement, the reader loops on the sending of a request 21. When it receives an acknowledgement ATQ, it then switches to a mode of checking whether the transponder really is a transponder intended for it, as well as to a possible anti-collision mode (block 23) to individualize several transponders in the field. Indeed, as a response to an interrogation request by a terminal, if several transponders are present in the field thereof, they may respond at the same time or with a sufficiently low time interval to make the result of the demodulation by the reader unexploitable. Said reader must then either select a transponder with which it wishes to communicate, or assign different channels to the different transponders.

A communication only starts when the initialization and anti-collision process illustrated in FIG. 2 is over (block 25, E), that is, when the reader has detected (block 24) that it has identified all the transponders present in its field. As long as all transponders have not been identified, it starts the sending of interrogation requests. If a transponder has been properly identified, it is placed in a state where it no longer acknowledges the interrogation requests to avoid interfering with the detection of the other possible transponders.

An initialization and anti-collision process of the type briefly described hereabove in relation with FIG. 2 is known. Illustrations of conventional methods are for example to be found in French patent applications No. 2,760,280 and 2,773,627, which are incorporated herein by reference.

The implementation of the method illustrated in FIG. 2 is most often performed by determining a maximum number of cards likely to be present in the reader's field. As described, in particular, in French patent application N°2,760,280, this number can be modified by the reader according to the results of exploitation of the anti-collision process (block 23) to increase the detection probabilities and reduce the duration of the initialization process.

Indeed, the duration preceding the establishing of a communication between a read/write terminal and one or several transponders is a critical parameter in the use of such transponder systems. A transponder is often formed by a badge or by a contactless card handled by a user. If said user does not obtain an almost immediate communication with the reader, he will have a tendency to modify the position of his card or to believe that the system does not operate. It is considered that beyond a period of 100 milliseconds, the duration of establishment of a communication for a reliable operation with a transponder is too high.

Now, as discussed hereabove, this duration depends on the number of recognition loops to be performed by the reader before the communication is established to determine the number of transponders present in its field. This number of loops essentially depends on the number of transponders to be isolated.

Up to now, this number can only be determined by implementing statistic computations and probability algorithms tending to minimize the number of loops along the transponder detection.

SUMMARY OF THE INVENTION

The present invention aims at reducing the time required to initialize and establish communications between a read/write terminal of electromagnetic transponders and one or several transponders having entered its field, that is, to reduce the duration required by the read/write terminal to determine and identify all the transponders present at a given time in its field.

The present invention more specifically aims at providing a solution that enables reducing the number of request loops performed by this terminal.

The present invention also aims at optimizing the dynamic adaptation of the number of transponders to be detected taken into account in conventional anti-collision processes.

The present invention further aims at providing a solution which does not require using the detection results of the terminal's demodulator.

To achieve these and other objects, the present invention provides a terminal for generating a high-frequency electromagnetic field by means of an oscillating circuit, adapted to cooperating with at least one transponder when said transponder enters this field, and including means for regulating the signal phase in the oscillating circuit with respect to a reference value and means for evaluating, based on a measurement of the current in the oscillating circuit, the minimum number of transponders present in the field.

According to an embodiment of the present invention, the terminal further includes means for, based on a measurement of the voltage across a capacitive element of the oscillating circuit, evaluating the maximum number of transponders present in the terminal's field.

According to an embodiment of the present invention, the terminal includes means for determining and storing characteristic information relative to the voltages across the capacitive element of its oscillating circuit and to the currents in this oscillating circuit, in several determined configurations of the distance separating one or several transponders from the terminal, and for taking these characteristic information into account in evaluating the number of transponders.

According to an embodiment of the present invention, said characteristic information includes, among others, the voltage across the capacitive element when no transponder is present in the field of the terminal, the voltage across the capacitive element when a transponder is in a relation of maximum closeness with the terminal, the current in the oscillating circuit when no transponder is present in the terminal's field, and the current in the oscillating circuit when a transponder is in a relation of maximum closeness with the terminal.

According to an embodiment of the present invention, the evaluation of the number of cards is performed without interpreting possible data messages carried by the high-frequency field.

The present invention also provides a method for establishing at least one communication between high-frequency magnetic field generation terminal and an electromagnetic transponder, including periodically sending a request sequence until at least one transponder entering the field sends an acknowledgement, and of evaluating, based on a measurement of the current in an oscillating circuit of the terminal, a minimum number of transponders likely to be present in the field.

According to an embodiment of the present invention, said evaluation includes comparing the measured current with previously calculated and stored values corresponding to evaluations of the maximum current for several minimum numbers of transponders.

According to an embodiment of the present invention, the method further includes, based on the evaluation of the minimum number and on a measurement of the present voltage across a capacitive element of the oscillating circuit, evaluating a maximum number of transponders likely to be present in the terminal's field.

The foregoing objects, features and advantages of the present invention, will be discussed in detail in the following non-limiting description of specific embodiments in connection with the accompanying drawings.

DETAILED DESCRIPTION

Figure 1:
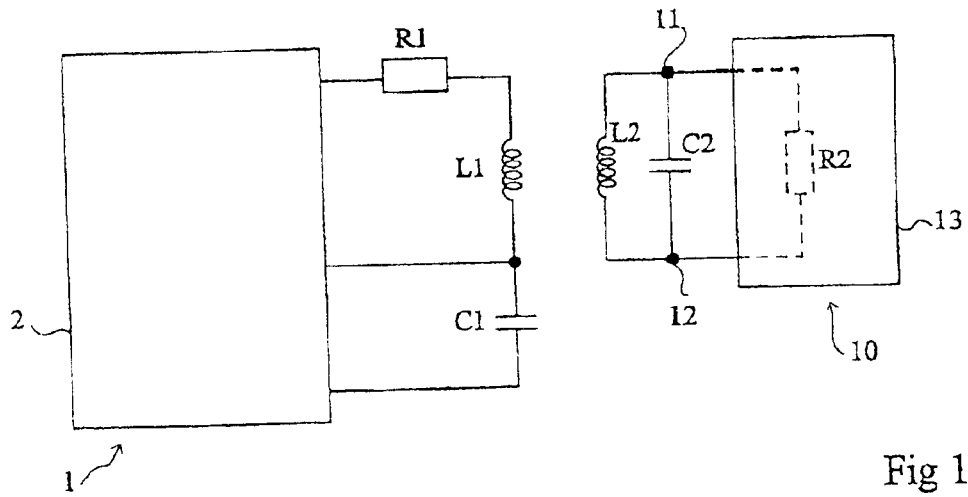
FIGS. 1 and 2, previously described, are intended for showing the state of the art and the problem to solve.

The same elements have been referred to with the same references in the different drawings. For clarity, the characteristics of FIGS. 4 and 8 have been plotted with no scale consideration and only those elements of a terminal or of a transponder and those steps of processes that are necessary to the understanding of the present invention have been shown in the drawings and will be described hereafter. In particular, the means used to perform the calculations in the method of the present invention have not been detailed since they are conventional. This will be, for example, the microprocessor generally provided in a read/write terminal. Further, reference will often be made to "cards" to designate the transponders, but it should be noted that the present invention applies whatever the type of transponder, be it or not provided with a microprocessor (card of credit-card type, electronic label, etc.).

A feature of the present invention is to provide an evaluation of the number of cards present in the field of a read/write terminal based on physical measurements performed on the terminal's oscillating circuit. More specifically, according to the present invention, the number of cards in the terminal's field is evaluated by comparing the values of the current in the terminal's oscillating circuit and the voltage across the capacitor of this oscillating circuit, with values measured and/or stored in a learning phase preceding the putting into service of the terminal.

Figure 2:
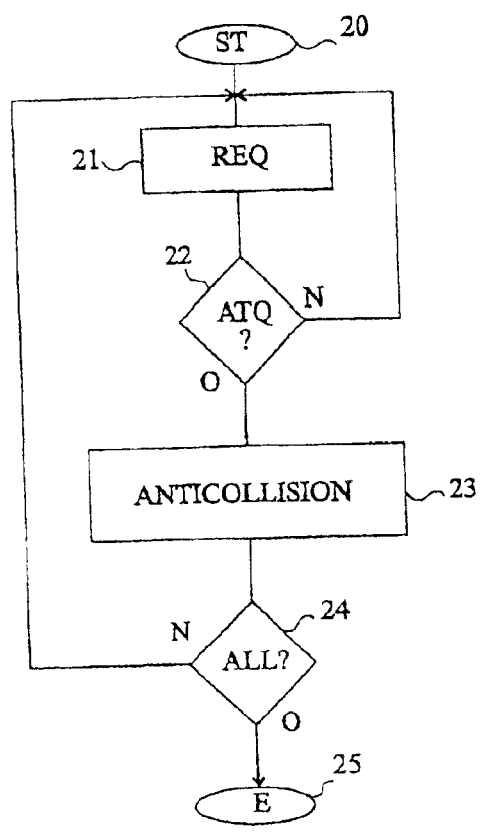

The evaluation of this number of transponders considerably reduces the number of loops of the communication initialization or anti-collision process (FIG. 2). Indeed, even if a method dynamically adapting the number based on measurements is used, the initial number taken into account is refined as compared to a conventional implementation. According to the present invention, the evaluation of the number of cards is performed (upstream of the demodulator) without requiring to exploit the received data signal (that is, downstream of the terminal's demodulator). The present invention provides evaluating this number based on the sole current and voltage electric determinations and on calculations of these variables.

To obtain the information relative to the number of transponders or cards, one could think that it is enough to measure the load variation formed by an increase of the number of transponders in the terminal's field on the oscillating circuit thereof. However, such a measurement is unexploitable in practice, since such a variation is not linear according to the number of cards present in the field. Further, the load formed by a transponder on the oscillating circuit depends on the distance separating this transponder from the terminal. Now, the variation range, evaluated across the capacitor of the terminal's oscillating circuit (capacitor C1, FIG. 1) depends on the tuning of this oscillating circuit as well as on the tuning of the transponder's oscillating circuit on the remote supply carrier frequency. Now, in conventional circuits, the tuning is not perfect.

In particular, in most conventional terminals, the tuning of the resonance frequency to the carrier frequency is performed manually by means of a variable capacitor, once the terminal has been made. The tuning requires adjusting, especially due to the manufacturing tolerances of the capacitive and inductive elements, to guarantee the phase operating point chosen between a reference signal provided by an oscillator of the terminal and the received signal, sampled, for example, across capacitor C1. A detuning of the terminal's oscillating circuit has several consequences and, in particular, that of modifying the signal amplitude in this oscillating circuit and, accordingly, the available amplitude of the signal for a possible evaluation.

Thus, another feature of the present invention is to provide a regulation of the phase of the terminal's oscillating circuit with respect to a reference value. According to the present invention, this phase regulation is performed by means of a loop having a response time chosen for the loop to be sufficiently slow to avoid disturbing the possible back-modulation coming from a transponder, and sufficiently fast as compared to the passing speed of a transponder in the terminal's field. This can be called a static regulation with respect to the modulation frequencies (for example, the 13.56-MHz remote supply carrier frequency and the 847.5 kHz back-modulation frequency used in the data transmission from the transponder to the terminal).

Figure 3:
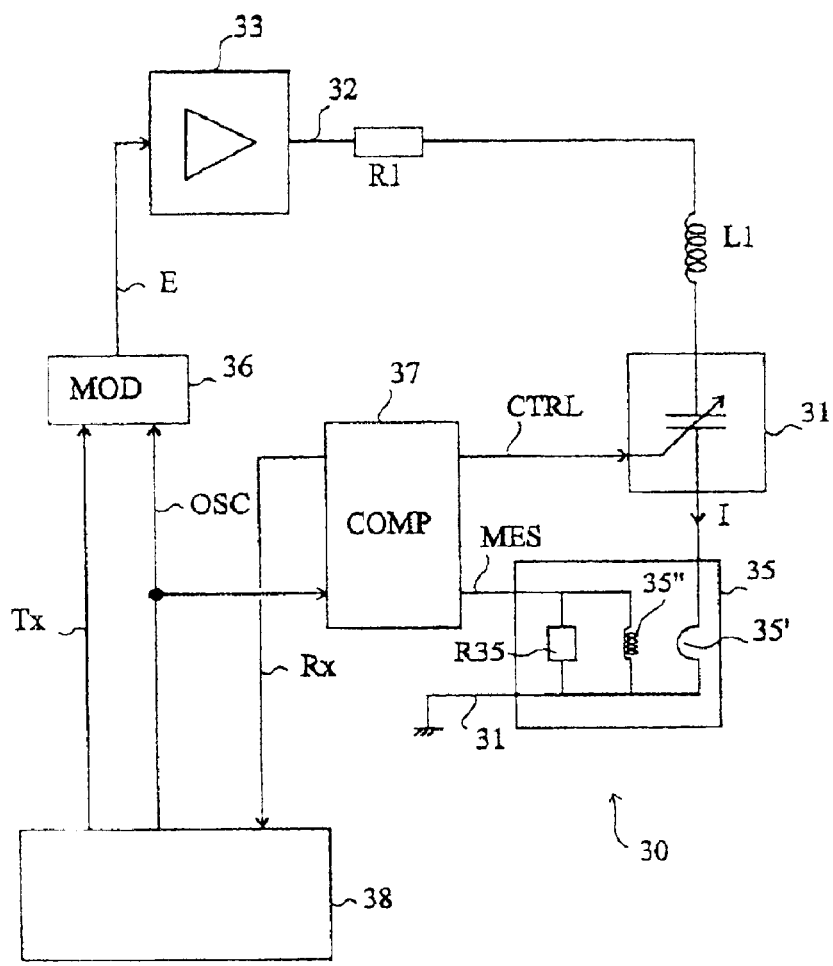
FIG. 3 shows, in the form of blocks, an embodiment of an electromagnetic transponder read/write terminal according to the present invention.

FIG. 3 shows in the form of blocks an embodiment of a terminal 30 according to the present invention, equipped with a phase regulation loop of the oscillating circuit.

Conventionally, terminal 30 includes an oscillating circuit formed of an inductance or antenna L1, in series with a capacitive element 31 and a resistive element R1, between an output terminal 32 of an amplifier or antenna coupler 33 and a terminal 34 at a reference potential (generally, the ground). An element 35 for measuring the current in the oscillating circuit is interposed, for example, between capacitive element 31 and ground 34. Measurement element 35 belongs to the phase regulation loop which will be described hereafter. Amplifier 33 receives a high-frequency transmission signal E, coming from a modulator 36 (MOD) that receives a reference frequency (signal OSC) for example, from a quartz oscillator (not shown). Modulator 36 receives, if necessary, a signal Tx of data to be transmitted and, in the absence of any data transmission from the terminal, provides the high-frequency carrier (for example, at 13.56 MHz) adapted to remotely supplying a transponder. Capacitive element 31 is a variable-capacitance element controllable by a signal CTRL.

In terminal 30, a phase regulation of the current in antenna L1 is performed with respect to a reference signal. This regulation is a regulation of the high-frequency signal, that is, of the carrier signal corresponding to signal E in the absence of data to be transmitted. This regulation is performed by varying the capacitance of the oscillating circuit of terminal 30 to maintain the current in the antenna in a constant phase relation with the reference signal which corresponds, for example, to signal OSC provided by the modulator's oscillator. Signal CTRL originates from a circuit 37 (COMP) having the function of detecting the phase interval with respect to the reference signal and accordingly modifying the capacitance of element 31. The phase measurement is performed from a measurement of current I in the circuit by means of current transformer 35 connected in series with element 31. This transformer generally is formed of a primary winding 35' between element 31 and ground terminal 34, and of a secondary winding 35", a first terminal of which is directly connected to ground 34 and a second terminal of which provides a signal MES providing the result of the measurement, a current-to-voltage conversion resistor R35 being connected in parallel with secondary winding 35". The result of measurement MES is sent to comparator 37, which accordingly controls capacitive element 31 by means of signal CTRL.

According to a preferred embodiment such as illustrated in FIG. 3, comparator 37 uses the same phase demodulator (not shown) as that which is used to demodulate the signal coming from the transponder and which may be received by the oscillating circuit. Accordingly, as illustrated in FIG. 3, comparator 37 provides a signal Rx giving back a possible back-modulation of data received from a transponder to a block 38 symbolizing the rest of the terminal's electronic circuits.

The practical implementation of the phase regulation loop is within the abilities of those skilled in the art, using conventional means and based on the functional indications given hereabove. As an alternative to the current transformer of FIG. 3, other conventional means may be used. An example of a phase regulation terminal is described in document EP-A-0857981, which is incorporated herein by reference.

By regulating the phase of the terminal's oscillating circuit on a reference value, not only the possible problems of sizing tolerances of the oscillating circuit components and of the drifts of these components in operation are overcome, but it becomes also possible to perform reliable measurements relative to the magnetic coupling between the terminal's oscillating circuit and that of one or several transponders.

Due to the use of a phase regulation loop, current and voltage measurements in the terminal's oscillating circuit can now be exploited to deduce therefrom, according to the present invention, information relative to the number of transponders or cards present in the field. This information especially takes into account the coupling between each of the cards and the terminal, that is, the coupling coefficient between the two interacting oscillating circuits. This coupling coefficient essentially depends on the distance separating the transponder from the terminal. It should be noted that the coupling coefficient between the oscillating circuits of a transponder and of the terminal always ranges between 0 and 1, and that the distance separating the antennas of the oscillating circuits is, as a first approximation, proportional to 1-k. Accordingly, in the following description, reference will be made either to the distance or to the coupling coefficient.

The present invention originates from an interpretation of different relations between the electric variables measured by the terminal in different operating configurations with one or several transponders.

In particular, current I in the series oscillating circuit of the terminal (for example, measured by transformer 23) is linked to the so-called generator voltage (called Vg) exciting the oscillating circuit and to apparent impedance Z1app of the oscillating circuit, by the following relation:

$$I = \frac{Vg}{Z1_{app}}. \qquad \text{(formula 1)}$$

Further, the fact of regulating the phase of the oscillating circuit on a reference value provides that the distance variation of a transponder entering the terminal's field only translates as a modification of the real part of the impedance of this oscillating circuit. Indeed, all the variations which would tend to modify, statically as compared to the modulation frequencies, the imaginary part by the load formed of the transponder (or the transponders) are compensated for by the phase regulation loop. Thus, it is ensured that, in static operation, the imaginary part of impedance Z1app is null. Accordingly, impedance Z1app becomes equal to apparent resistance R1app and can be expressed as:

$$Z1_{app} = R1_{app} = R1 + a^2 \cdot \frac{L2}{R2 \cdot C2}, \qquad \text{(formula 2)}$$

with:

$$a^2 = \frac{k^2 \cdot \omega^2 \cdot L1 \cdot L2}{X2^2 + \left(\frac{L2}{R2 \cdot C2}\right)^2}, \qquad \text{(formula 3)}$$

where $\omega$ represents the pulse, X2 represents the imaginary part of the impedance of the transponder's oscillating circuit (X2=$\omega$L2−1/$\omega$C2), and where R2 represents the load formed by the transponder's components on its own oscillating circuit, modeled in FIG. 1 by a resistor R2 shown in dotted lines in parallel with inductance L2 and capacitor C2. In other words, resistance R2 represents the equivalent resistance of all the circuits (microprocessors, back-modulation means, etc.) of the transponder, added in parallel on capacitor C2 and inductance L2. In formula 2 hereabove, the series resistance of inductance L1, which adds to the two other terms, has been neglected. It can also be considered that the value of this series resistance is, for simplification, included in the value of resistance R1.

Formulas 2 and 3 hereabove have been established in the case where a single transponder is present in the terminal's field. If, however, several transponders are present in this field, their respective contributions to the apparent impedance (more specifically, to the apparent resistance) on the terminal side should be added. Accordingly, for n transponders present in the terminal's field, one may write:

$$Z1_{app} = R1 + \sum_{i=1}^{n} a_i^2 \cdot \frac{L2_i}{R2_i \cdot C2_i}. \qquad \text{(formula 4)}$$

Considering that the transponders are of the same type, that is, have substantially similar characteristics, which is a realistic approximation, above formula 4 becomes:

$$Z1_{app} = R1 + \frac{L2}{R2 \cdot C2} \cdot \sum_{i=1}^{n} a_i^2. \qquad \text{(formula 5)}$$

The only term which is then variable is that depending on the coupling between oscillating circuits, and thus on the distance between each transponder and the terminal.

For n cards having different coupling coefficients $k_i$, one may write:

$$\sum_{i=1}^{n} a_i^2 = \frac{\omega^2 \cdot L1 \cdot L2}{Z2^2} \cdot \sum_{i=1}^{n} k_i^2, \quad \text{(formula 6)}$$

with:

$$Z2^2 = X2^2 + \left(\frac{L2}{R2 \cdot C2}\right)^2. \quad \text{(formula 7)}$$

As a first approximation, it may be considered that, as seen from the terminal, everything occurs as if it saw n transponders having the same coupling coefficient corresponding to an average coupling coefficient. Accordingly, an average coupling coefficient per card can be defined as being given by the following relation:

$$k_{av}^2 = \sum_{i=1}^{n} \frac{k_i^2}{n}. \quad \text{(formula 8)}$$

It should be noted that this amounts to defining a coefficient $a_{av}$ by the following relation:

$$\sum_{i=1}^{n} a_i^2 = n \cdot a_{av}^2. \quad \text{(formula 9)}$$

It can be considered that, for n cards or transponders present in the terminal's field, current I measured by its intensity transformer depends on the number of cards and on their respective coupling coefficient expressed as a function of an average coupling coefficient as follows:

$$I = \frac{Vg}{R1 + n \cdot k_{av}^2 \cdot \frac{\omega^2 \cdot L1 \cdot L2^2}{Z2^2 \cdot R2 \cdot C2}}. \quad \text{(formula 10)}$$

Intuitively, it can be seen that if all transponders have the same coupling coefficient with the terminal, that is, if they all are at the same distance, current I decreases with an increase of the number of transponders present in the field. Similarly, for the same current measured in the terminal's oscillating circuit, a decrease in the coupling coefficient of each transponder implies an increase in the number of transponders in the field. In other words, the product of the number of transponders by the square of the average coupling coefficient per transponder can be considered as being constant.

Among the electric variable measurements that can easily be performed on the read/write terminal side, the present invention provides using the off-load and maximum coupling values corresponding to the following cases.

The off-load values represent the current and the voltage when no transponder is present in the terminal's field. In this off-load operation, the apparent impedance $Z1_{off-load}$ of the terminal's oscillating circuit now only depends on components R1, L1, and C1 of the terminal. Further, since, due to the phase regulation, the imaginary part of this impedance is always null, one may write:

$$I_{off-load} = \frac{Vg}{R1}. \quad \text{(formula 11)}$$

Another operating condition that can easily be determined corresponds to maximum coupling $k_{max}$. In this condition, that is, in a relation of minimum distance between a transponder and the terminal (for example, the transponder being laid on the terminal as close as possible to antenna L1), the measurement of current $I_{max}$ in the terminal's oscillating circuit can be performed while a transponder of the concerned family or type is laid on the terminal.

Assuming that, in above formula 10, only values Vg, n, and $k_{av}$ are likely to vary for a given terminal and a given family of transponders, and writing this relation, at maximum coupling, for one card and for n cards, the following can be deduced:

$$I_{\max(n)} = \frac{Vg}{R1 + n \cdot \left(\frac{k_{av}}{k_{\max}}\right)^2 \cdot \left(\frac{Vg}{I_{\max(1)} - R1}\right)}, \quad \text{(formula 12)}$$

with $I_{max}(1)$ and $I_{max}(n)$ representing the currents at the maximum coupling respectively for 1 and n cards.

By combining formulas 11 and 12, the following relation is obtained:

$$I_{\max(n)} = \frac{1}{\frac{n}{I_{\max(1)}} + \frac{1-n}{I_{off-load}}}. \quad \text{(formula 13)}$$

Now, the off-load and maximum coupling currents for a card can be measured in a learning phase of the reader by using a sample card for the current at maximum coupling $I_{max}(1)$. Accordingly, the reader is able to calculate the different values of the current at maximum coupling for 2, 3, 4, etc. cards, the maximum number of calculated values being linked to the application and to the maximum number of cards estimated to be likely to be found in the reader's field.

Figure 4:
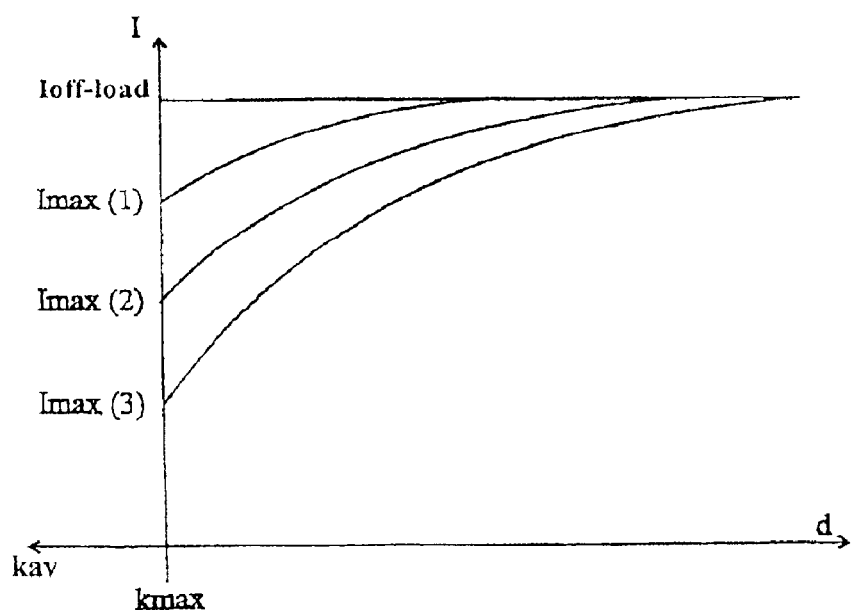
FIG. 4 shows variation characteristics of the current in the oscillating circuit of a terminal according to the present invention as a function of the distance at which are located one or several transponders, to illustrate a learning phase of the method of evaluation of the number of transponders according to the present invention.

FIG. 4 illustrates an example of a family of curves of current I in the terminal's oscillating circuit according to distance d or, more specifically, to the average coupling coefficient per card in the reader's field. The scale of the average coupling decreases to the right while the distance scale increases to the right.

As illustrated by the family of curves of FIG. 4, the maximum current at maximum coupling $k_{max}$, that is, at a null distance, decreases as the number of cards in the terminal's field increases. Further, all curves substantially have the same shape and join the horizontal shape of the off-load current as the distance increases (or as the average coupling coefficient per card decreases). It should be noted that the curves do not cross one another.

Accordingly, by measuring, upon operation of the reader, the current in its oscillating circuit, the minimum number of cards in the field can be determined by comparing this measured current with the different values calculated during the learning phase. It should be noted that, regarding the curves of FIG. 4, the calculations of the learning phase do not result in directly plotting the family of curves but simply in calculating the different possible maximum currents.

Figure 5:
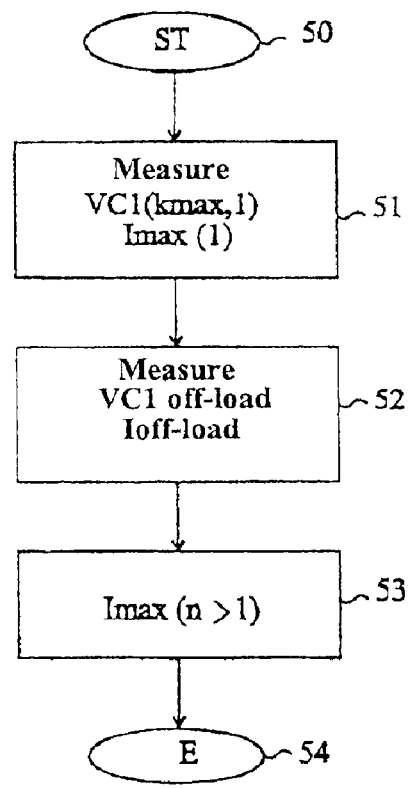
FIG. 5 is a simplified flowchart illustrating an embodiment of a learning phase of the method of evaluation of the number of transponders according to the present invention.

FIG. 5 shows a flowchart of an embodiment of a learning and preparation phase according to the present invention.

At the beginning (block 50, ST), the reader is turned on and configured by means of its internal computer for a learning phase. Voltage VC1 and current I at the maximum coupling for a card are measured (block 51). This measurement is performed by using a sample card which is placed at a minimum distance from the terminal, ideally at a null distance. Current $I_{max}(1)$ is for example measured by an intensity transformer (35, FIG. 3) while voltage $VC1(k_{max}, 1)$ is measured, for example, across capacitor 31. It should be noted that, for the actual learning phase illustrated by FIG. 5, only the current measurement is necessary. However, to implement a preferred embodiment of the present invention which will be described hereafter, voltage VC1 is measured.

In a second step (block 52), the off-load voltage and current $VC1_{off-load}$ and $I_{off-load}$ are measured and stored. These measurements are performed as no card is present in the terminal's field. Of course, the order of the measurements between the off-load operation and the maximum coupling is arbitrary. The off-load measurements (which are independent from the family or type of cards meant to operate with the terminal) may even be performed independently from the maximum coupling measurements (which can be renewed, for example, to change the type of cards intended for operating with the terminal).

Based on the current values measured at blocks 51 and 52, the computer means of the reader calculate (block 53) a set of current values corresponding to the maximum coupling for several cards. These values of $I_{max(n>1)}$ correspond to those illustrated in FIG. 4, the maximum number of calculated values depending on the application.

The learning phase is then over (block 54, E) and the reader is able to determine, each time one or several transponders will appear in its field, the minimum number of transponders. This number will enable adapting the request procedures and, more specifically, adapting the number of anti-collision steps to be implemented upon initialization of a transmission.

Figure 6:
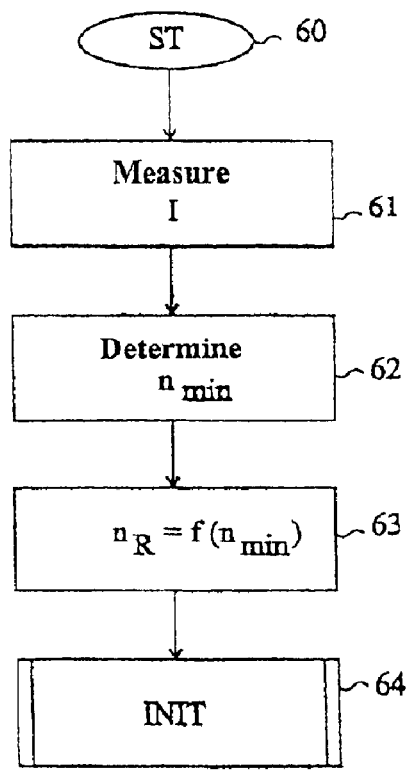
FIG. 6 is a flowchart illustrating, in a simplified manner, a first embodiment of a method for determining the number of transponders in the field of a terminal according to the present invention.

FIG. 6 shows a simplified flowchart of a first embodiment of the method for determining the number of cards according to the present invention.

According to this simplified embodiment, after the end (block 54, FIG. 5) of the learning phase, the reader switches to a conventional stand-by operating mode where it transmits periodic requests to monitor the occurrence of a transponder in its field.

As soon as the reader has detected the possible presence of a transponder, it starts a determination phase such as illustrated in FIG. 6. After a step (block 60, ST) of program initialization, the current value I of the current in the reader's oscillating circuit is measured (block 61). Then, based on the values previously calculated in the learning phase, the minimum number $n_{min}$ of transponders present in the terminal's field is determined (block 62).

For example, if the measured current I is included between off-load current $I_{off-load}$ and the maximum current for one card $I_{max(1)}$, two cases are possible. Either a single card is present in the reader's field and this card has a given coupling k (smaller than $k_{max}$). Or there are n cards in the reader's field, which all individually have couplings k smaller than coupling k of the first case.

If the measured current is included between two maximum current values for n and n+1 cards, it is certain to have at least n cards in the reader's field. There can however be more than n+1 cards if the average coupling per card is smaller than in the case where only n cards are present.

It is then possible to choose (block 63) a number nR of request cycles in the anti-collision process which is a function of this minimum number.

Based on this number, a conventional anti-collision process (block 64 illustrating the initialization INIT of a transmission) is then applied.

A first advantage that then appears with the simplified embodiment of the present invention such as described hereabove is that by knowing the minimum number of cards, the number of anti-collision requests can already be adjusted and time is already saved with respect to the conventional process.

Figure 7:
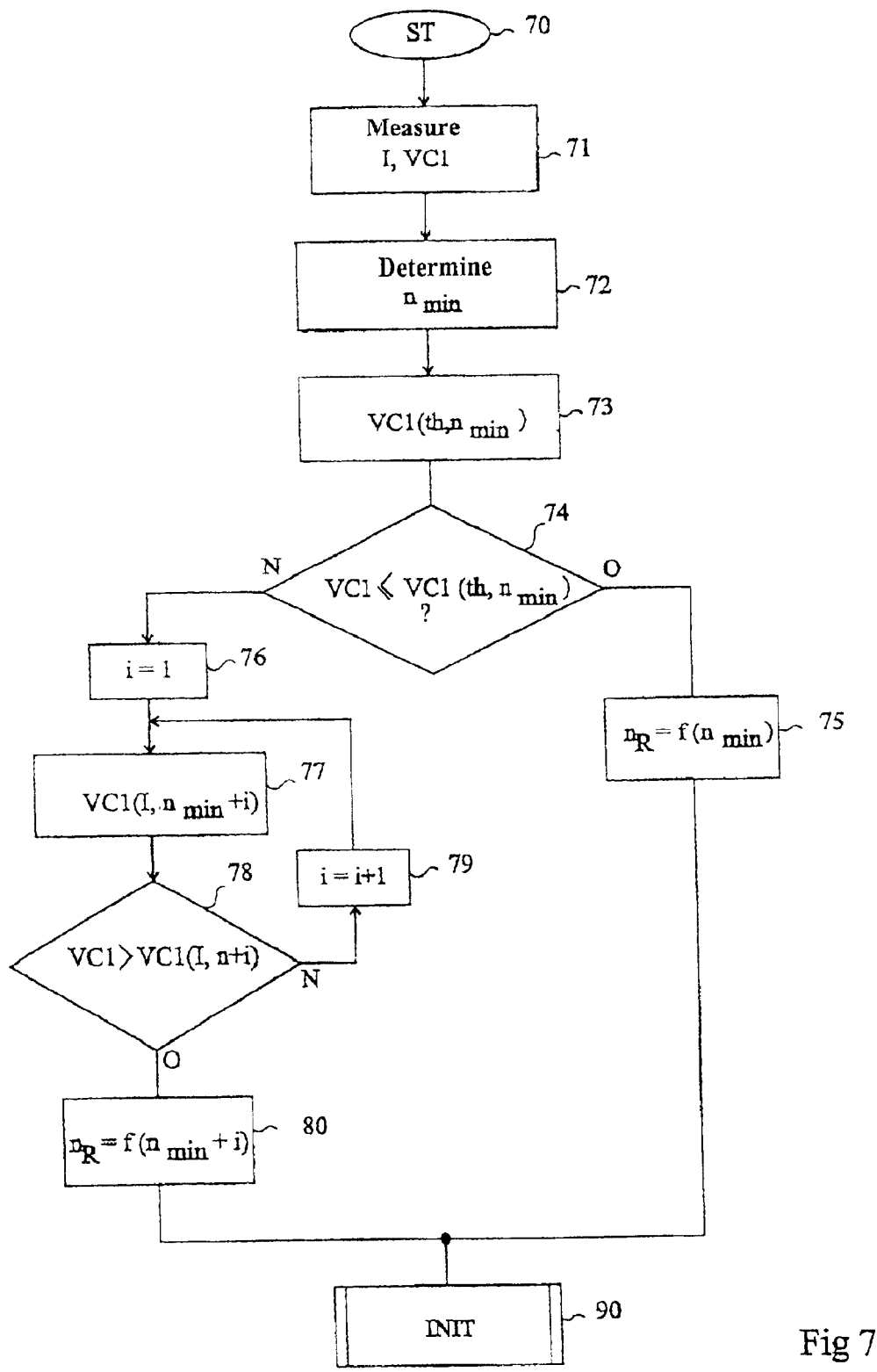
FIG. 7 is a simplified flowchart of a second embodiment of a method for determining the number of transponders in the field of a terminal according to the present invention.

FIG. 7 shows a simplified flowchart of a preferred embodiment of the present invention in which the determination of the number of request phases of the initialization process of a transmission is refined with respect to the simplified embodiment of FIG. 6.

According to the preferred embodiment of the present invention, after starting block 70 (ST), not only current I in the oscillating circuit, but also voltage VC1 across the capacitor of this circuit are measured (block 71).

Minimum number $n_{min}$ is then determined (block 72) as in the simplified process (block 62, FIG. 6).

According to the preferred embodiment of FIG. 7, a set of values $VC1(th,n_{min})$ corresponding to a set of theoretical values of voltages across capacitor C1 (element 31, FIG. 3) are then calculated (block 73) for each of the minimum numbers of the cards likely to be present in the terminal's field.

The calculation of these theoretical values is performed as follows.

Due to the phase regulation loop provided on the reader side, the theoretical voltage across the capacitive element of the reader can be calculated for each minimum number of cards, and the maximum number of cards present in the field can be deduced therefrom.

Indeed, it is known that imaginary part $X1_{app}$ of apparent impedance $Z1_{app}$ can be expressed as:

$$X1_{app} = X1 - a^2 X2, \quad \text{(formula 14)}$$

with:

$$X1 = \omega \cdot L1 - \frac{1}{\omega \cdot C1}. \quad \text{(formula 15)}$$

Now, due to the static phase regulation, this imaginary part $X1_{app}$ is null. Accordingly:

$$X1 = a^2 X2. \quad \text{(formula 16)}$$

Based on these relations, the difference between the current and off-load values can be expressed as follows:

$$X1 - X1_{off-load} = a^2 X2 - a_{off-load}^2 X2. \quad \text{(formula 17)}$$

Now, coefficient $a_{off-load}$ is null since the off-load coupling is null. Further, voltage VC1 across element 31 (neglecting the influence of current transformer 35) can be written as $I/\omega C1$, current I being, for example, measured by transformer 35. As a result, above formula 17 can be written as:

$$a^2 \cdot X2 = \frac{VC1_{off-load}}{I_{off-load}} - \frac{VC1}{I}. \quad \text{(formula 18)}$$

By applying formula 17 to the current value and to the maximum coupling, and by transferring these applications in formula 18, one may write, for one card:

$$\frac{a^2 \cdot X2}{a_{max}^2 \cdot X2} = \frac{\frac{VCl_{off-load}}{I_{off-load}} - \frac{VCl}{I}}{\frac{VCl_{off-load}}{I_{off-load}} - \frac{VCl_{max}}{I_{max}}}. \quad \text{(formula 19)}$$

Now, applying formula 3 to the above formula provides:

$$\frac{a^2 \cdot X2}{a_{max}^2 \cdot X2} = \frac{k^2}{k_{max}^2}. \quad \text{(formula 20)}$$

Thus, ratio k/kmax between the present and maximum coupling coefficients can be expressed, when a single transponder is present in the terminal's field, as:

$$\frac{k}{k_{max}} = \sqrt{\frac{\frac{VCl}{I} - \frac{VCl_{off-load}}{I_{off-load}}}{\frac{VCl_{max}}{I_{max}} - \frac{VCl_{off-load}}{I_{off-load}}}}. \quad \text{(formula 21)}$$

By applying formula 18 to maximum coupling $k_{max}$ and by expressing, based on formulas 1 and 2, the difference between the apparent impedances at the maximum coupling and off-load, one may write, having combined the expressions obtained for coefficient $a_{max}^2$:

$$\frac{X2 \cdot R2 \cdot C2}{L2} = \frac{\frac{VCl_{off-load}}{I_{off-load}} - \frac{VCl_{max}}{I_{max}}}{Vg \cdot \left(\frac{1}{I_{max}} - \frac{1}{I_{off-load}}\right)}. \quad \text{(formula 22)}$$

Now, ratio $$\frac{X2 \cdot R2 \cdot C2}{L2}$$

is constant and the above formula 22 can apply to any value of current I and of voltage VC1 (replacing the values at the maximum coupling).

Accordingly, the current voltage VC1 can be expressed as:

$$VCl = \left(K2 \cdot \left(\frac{1}{I} - \frac{1}{I_{off-load}}\right) + \frac{VCl_{off-load}}{I_{off-load}}\right) \cdot I, \quad \text{(formula 23)}$$

where constant K2 is equal to:

$$K2 = \frac{\frac{VCl_{max}}{I_{max}} - \frac{VCl_{off-load}}{I_{off-load}}}{\frac{1}{I_{max}} - \frac{1}{I_{off-load}}}. \quad \text{(formula 24)}$$

This constant can be calculated and stored during the learning phase based on the measured values (blocks 51 and 52, FIG. 5).

Equation 23 hereabove remains valid for several cards present in the terminal's field. Accordingly, based on the present measurement of the current (block 71, FIG. 7) and on the determination of the minimum number of cards $n_{min}$ (block 72), a theoretical value VC1(th,$n_{min}$) of voltage VC1 across capacitive element 31 can be deduced for $n_{min}$ cards, by applying the following relation that is deduced from formula 23:

$$VCl_{(th,n\ min)} = \left(K2 \cdot \left(\frac{1}{I} - \frac{1}{I_{off-load}}\right) + \frac{VCl_{off-load}}{I_{off-load}}\right) \cdot I. \quad \text{(formula 25)}$$

It is then possible to compare (block 74, FIG. 7) the present value of the voltage measured across element 31 to this theoretical value calculated for the previously-determined minimum area.

If the measured voltage is smaller than or equal to the theoretical value calculated for number $n_{min}$, this means that the number of cards present in the field is equal to the minimum number. In this case, number $n_R$ of request sequences of the anti-collision process is chosen (block 75) based on this number $n_{min}$, which is known to now correspond to the exact number of transponders.

If the measured value is greater than the theoretical value, this means that there are more than $n_{min}$ cards in the terminal's field.

It is then proceeded to another calculation phase including determining, based on the voltage measurement, the maximum number of cards present in the field. For this purpose, the calculation of the voltage VC1 that should be obtained to correspond to the current I measured for an increasing number $n_{min}$+i is iteratively performed. Indeed, since the minimum number of cards has been determined based on the current measurement, and since it is known that the real number of cards does not correspond to this minimum number, the number of cards in the terminal's field is smaller than the maximum coupling coefficient. In the opposite case, the measured current would have provided a greater minimum number of cards.

As illustrated by the example of embodiment of FIG. 7, a counter representing the additional increment i with respect to number $n_{min}$ of cards is initialized (block 76). By having set variable i to 1, a first voltage value VC1 is calculated for the measured current I and the minimum number of cards+1. The relation applied for the calculation of this value (block 77) is obtained in the following way which will be better understood in relation with FIG. 8.

Figure 8:
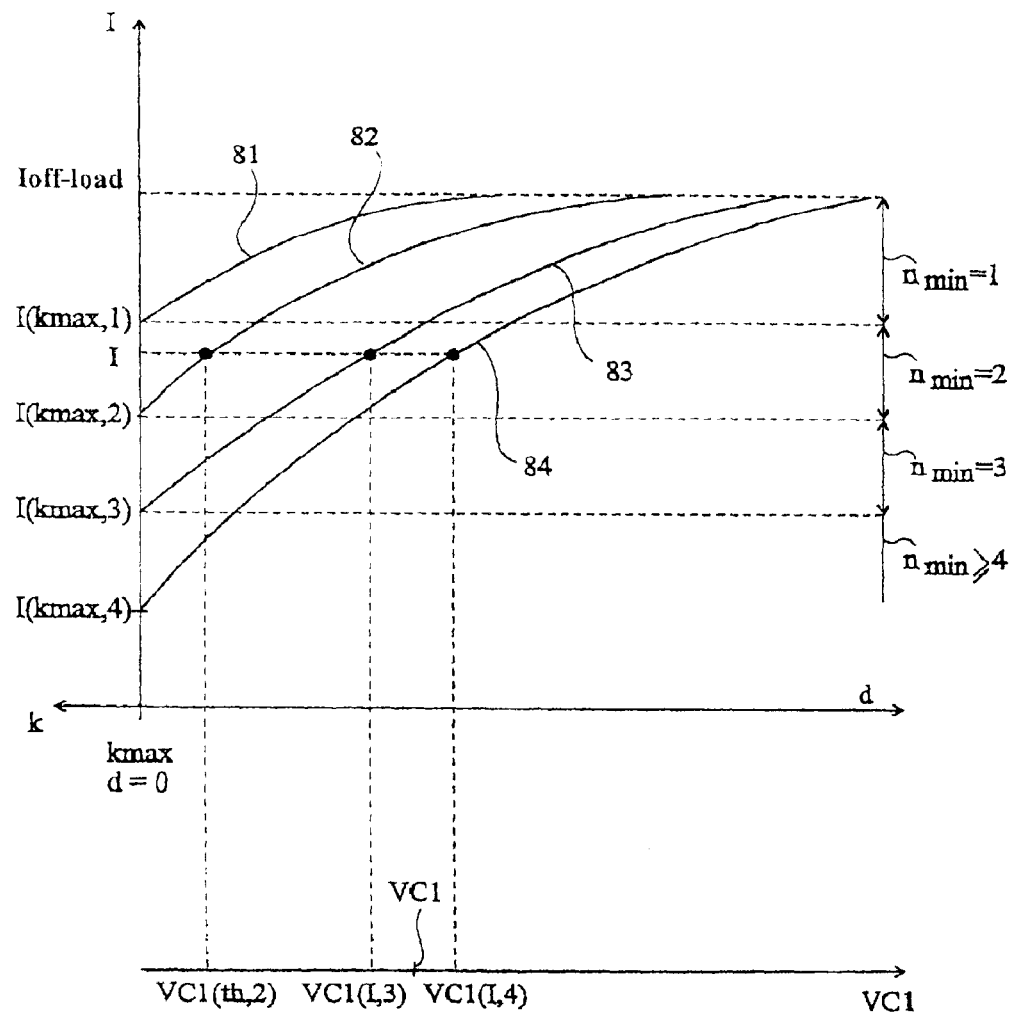
FIG. 8 shows a characteristic of the current in the terminal's oscillating circuit according to the coupling coefficient, and a characteristic of the voltage across the capacitor of this oscillating circuit, to illustrate the second embodiment of the method of the present invention.

FIG. 8 shows an example of shapes of current I in the oscillating circuit according to distance (or to coupling coefficient k) associated with a scale of values of voltage VC1 across capacitive element 31.

As illustrated by this drawing, the calculations (block 53, FIG. 5) performed during the learning phase enable determining points of origin of curves 81, 82, 83, and 84 that are all located at the maximum coupling coefficient $k_{max}$. Each curve corresponds to an increasing number of cards for a decreasing current. The measurement (block 52) of the off-load current defines the asymptote of the different curves. The plotting of the currents of FIG. 8 is to be compared with the plotting of FIG. 4. The determination of the different points on the current axis at the position of the maximum coupling coefficients or null distance enables determining areas (horizontal in the representation of the drawing) where the minimum number of cards is different from one area to the other. The measurement of voltage VC1 enables, afterwards, determining the maximum number of cards.

The calculation (block 73) of the theoretical voltage value, for the minimum number of cards obtained at value I of the measured current, determines an intersection point which, in the example shown in FIG. 8, is on curve 82 representing the shape of two cards.

The calculation performed at block 77 of FIG. 7 corresponds to determining the points of intersection of the line of measured current I with curves 83 and 84 corresponding to greater numbers of cards.

After having calculated a first value VC1 (I,3) for a unity increment i, the obtained value is compared with the measured value VC1 (block 78). As long as measured value VC1 is not greater than the calculated value, increment i is increased (block 79) and the calculation is resumed for a greater number of cards (value VC1(I,4)). In the example of FIG. 8, it is assumed that the measured value VC1 is included between the values for three and four cards. Taking the measured current into account, this means that the number of transponders is at most four, and thus included between 2 and 4. It is then possible to set (block 80) the number of requests of the anti-collision process to this maximum number (or to the maximum number+1 for reasons of determination security).

Afterwards, whether the number of requests has been determined by block 75 or by block 80, a conventional request process is performed while taking this number into account (block 90).

It should be noted that, although the representation of FIG. 8 illustrates complete theoretical curves, the calculations necessary to the implementation of the present invention only concern points of these curves that, in practice, need not be precisely determined.

The calculation of value VC1(I, $n_{min}$+i) is performed based on the following formula:

$$VC1_{(I,n_{\min}+1)} = \left(\frac{n_{\min}+i}{n_{\min}} \cdot \left(\frac{VC1_{(th,n_{\min})}}{I} - \frac{VC1_{off-load}}{I_{off-load}}\right) + \frac{VC1_{off-load}}{I_{off-load}}\right) \cdot I, \quad \text{(formula 26)}$$

which is deduced from the application of formula 21 to an average coupling coefficient per card in the area of the minimum number, considering that, for a given measured current, the average coupling coefficient is given by the following relation:

$$k^2(I, n+i) = \frac{n_{\min}+i}{n_{\min}} \cdot k^2(I, th, n_{\min}), \quad \text{(formula 27)}$$

where k(I,th,$n_{min}$) designates the average coupling coefficient per card corresponding to value $n_{min}$.

An advantage of the present invention is that it is now possible to determine at least the minimum number of transponders present in the field.

In the preferred embodiment illustrated hereabove, even the exact number or, at least a maximum number of transponders present in the field is determined. Knowing these numbers enables adapting the initialization algorithms of a communication when at least one transponder acknowledges an interrogation request transmitted by a terminal.

The fact of knowing a priori the number of cards in the reader's field enables evaluating the optimal number of request phases. The exchange time dedicated to the anti-collision protocol that must enable either selecting a card from among several cards presented at the same time in front of the reader, or identifying the cards in the reader's field, or allowing a selection sequencing of the different cards with which the reader must communicate, can thus be optimally reduced.

The adaptation of the foreseeable number of cards in the reader's field is performed, according to the present invention, as soon as a transponder acknowledges a request from the terminal. Initially, it can be provided to arbitrarily or conventionally set this number if a predetermined number is required to implement the interrogation process.

As soon as the reader detects the presence of a transponder, it performs the procedure of determination of the number of transponders by using the data calculated during the learning. By implementing the present invention, it is now no longer necessary to provide a dynamic adaptation of this number of requests outside of the bracket of the minimum number and of the maximum number determined by the method of the present invention. For the rest, a conventional interrogation, anti-collision and initialization process can be used.

It should be noted that number $n_R$ of requests does not necessarily correspond to the maximum or exact number determined by the present invention, but is a function of this number (for example, product or quotient by a predetermined coefficient, sum or subtraction of a predetermined number).

Of course, the present invention is likely to have various alterations, modifications, and improvements which will readily occur to those skilled in the art. In particular, the practical implementation of the present invention based on the functional indications given hereabove is within the abilities of those skilled in the art. It should only be noted that they will generally resort to usual techniques of programming of digital processing circuits present in transponder read/write terminals. Thus, since the present invention essentially implements calculation processes, it may be used with minor modifications of a conventional terminal mostly including arranging current and voltage information in the terminal's oscillating circuit.

Among the applications of the present invention are contactless chip cards (for example, identification cards for access control, electronic purse cards, cards for storing information about the card holder, consumer fidelity cards, toll television cards, etc.) and read or read/write systems for these cards (for example, access control terminals or porticoes, automatic dispensers, computer terminals, telephone terminals, televisions or satellite decoders, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating a high-frequency electromagnetic field by means of an oscillating circuit, adapted to cooperate with at least one transponder when said transponder enters the electromagnetic field, and including:

means for regulating a signal phase in the oscillating circuit with respect to a reference value; and means for evaluating, based on a measurement of a current in the oscillating circuit, a minimum number of transponders present in the electromagnetic field.

2. The terminal of claim 1, further including means for evaluating, based on a measurement of a voltage across a capacitive element of the oscillating circuit, a maximum number of transponders present in the electromagnetic field.

3. The terminal of claim 1, including means for determining and storing characteristic information, relative to voltages across the capacitive element of the oscillating circuit and to currents in the oscillating circuit, in several determined configurations, of a distance separating one or several transponders from the terminal, and for taking the characteristic information into account in evaluating the maximum and/or minimum number of transponders.

4. The terminal of claim 3, wherein said characteristic information includes:

a voltage across the capacitive element when no transponder is present in the electromagnetic field of the terminal;

a voltage across the capacitive element when a transponder is in a relation of maximum closeness with the terminal;

a current in the oscillating circuit when no transponder is present in the electromagnetic field; and a current in the oscillating circuit when a transponder is in a relation of maximum closeness with the terminal.

5. The terminal of claim 1, wherein evaluation of the minimum number of cards is performed without interpreting possible data messages carried by the high-frequency electromagnetic field.

6. A method of establishing at least one communication between a terminal generating a high-frequency electromagnetic field and a transponder, including:

periodically sending a request sequence until at least one transponder entering the field sends an acknowledgement, and evaluating, based on a measurement of a current in an oscillating circuit of the terminal, a minimum number of transponders likely to be present in the electromagnetic field.

7. The method of claim 6, wherein said evaluating includes comparing a measured current with previously calculated and stored values corresponding to evaluations of a maximum current for several minimum numbers of transponders.

8. The method of claim 6, further including, based on evaluation of the minimum number and on a measurement of a present voltage across a capacitive element of the oscillating circuit, evaluating a maximum number of transponders likely to be present in the electromagnetic field.

9. The terminal of claim 1, wherein the means for evaluating includes means for evaluating the minimum number of transponders present in the electromagnetic field at a particular time.

10. The method of claim 6, wherein the evaluating includes evaluating the minimum number of transponders likely to be present in the electromagnetic field at a particular time.

11. A terminal adapted to generate an electromagnetic field and to communicate with at least one transponder that is present in the electromagnetic field, the terminal comprising:

an oscillating circuit;

a first circuit to measure the current in the oscillating circuit; and a second circuit to determine, based at least in part on the measured current, a minimum number of transponders present in the electromagnetic field.

12. The terminal of claim 11, wherein the second circuit comprises a microprocessor.

13. The terminal of claim 11, wherein the first circuit includes means for measuring the current in the oscillating circuit.

14. The terminal of claim 11, wherein the second circuit includes means for determining, based at least in part on the measured current, a minimum number of transponders present in the electromagnetic field.

15. The terminal of claim 11, further comprising:

a phase regulation loop adapted to regulate a phase of a current in the oscillating circuit.

16. The terminal of claim 15, wherein the oscillating circuit comprises a variable capacitance, and wherein the phase regulation loop includes a comparator circuit that generates a control signal responsive to a detected phase interval between the phase of the current in the oscillating circuit and a reference value, and wherein a value of the variable capacitance is controlled by the control signal.

17. The terminal of claim 11, wherein the oscillating circuit comprises a capacitive element, the terminal further comprising:

voltage-measuring circuitry to measure a voltage across the capacitive element of the oscillating circuit, wherein the second circuit is operative to determine a maximum number of transponders present in the electromagnetic field based at least in part on the measured voltage.

18. The terminal of claim 11, wherein the second circuit is operative to determine the minimum number of transponders present in the electromagnetic field without analyzing data transmitted by any of the at least one transponder present in the electromagnetic field.

19. The terminal of claim 11, wherein the second circuit is operative to determine the minimum number of transponders present in the electromagnetic field at a particular time.

20. A method of determining a number of transponders present in an electromagnetic field generated by a terminal including an oscillating circuit, the method comprising:

measuring a current in the oscillating circuit; and determining, based on a comparison of the measured current with a reference value, a minimum number of transponders present in the electromagnetic field.

21. The method of claim 20, further comprising:

regulating a phase of a current signal in the oscillating circuit.

22. The method of claim 21, wherein the oscillating circuit comprises a variable capacitance, and wherein regulating a phase of the current signal includes detecting a phase interval between the phase of the current in the oscillating circuit and a reference value, and generating a control signal in response to the detection, the control signal controlling a value of the variable capacitance.

23. The method of claim 20, wherein the oscillating circuit comprises a capacitive element, the method further comprising:

measuring a voltage across the capacitive element of the oscillating circuit, and determining a maximum number of transponders present in the electromagnetic field based at least in part on the measured voltage.

24. The method of claim 20, wherein the minimum number of transponders present in the electromagnetic field is determined without analyzing data transmitted from any of the number of transponders present in the electromagnetic field.

25. The method of claim 20, wherein the determining includes determining the minimum number of transponders present in the electromagnetic field at a particular time.

* * * * *

UNITED STATES PATENT AND TRADEMARK OFFICE
CERTIFICATE OF CORRECTION

PATENT NO. : 6,879,246 B2
DATED : April 12, 2005
INVENTOR(S) : Luc Wuidart

It is certified that error appears in the above-identified patent and that said Letters Patent is hereby corrected as shown below:

<u>Title page,</u>
Item [30], should read:
-- [30]  Foreign Application Priority Data
May 12, 2000 (FR)……………………...0006065 --

Signed and Sealed this

Twenty-sixth Day of July, 2005

JON W. DUDAS
*Director of the United States Patent and Trademark Office*